US006909524B2

(12) United States Patent
Miyake

(10) Patent No.: US 6,909,524 B2
(45) Date of Patent: Jun. 21, 2005

(54) IMAGE PROCESSOR WHICH CAN ADD PREDETERMINED INFORMATION TO AN IMAGE WHILE MINIMIZING IMAGE-QUALITY DEGRADATION, AND METHODS THEREFOR

(75) Inventor: Nobutaka Miyake, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 472 days.

(21) Appl. No.: 09/970,048

(22) Filed: Oct. 2, 2001

(65) Prior Publication Data

US 2002/0118392 A1 Aug. 29, 2002

Related U.S. Application Data

(63) Continuation of application No. 09/900,033, filed on Jul. 9, 2001.

(30) Foreign Application Priority Data

Jul. 11, 2000 (JP) .......................... 2000-209752

(51) Int. Cl.[7] .......................... H04N 1/405; G06K 15/00; G06K 9/00
(52) U.S. Cl. ..................... 358/3.03; 358/3.05; 358/3.13; 358/3.14; 358/3.16; 358/3.19; 358/3.22; 358/3.23; 358/3.28; 382/100
(58) Field of Search ............................. 358/3.03, 3.04, 358/3.05, 3.06, 3.07, 3.08, 3.09, 3.13, 3.14, 3.16, 3.17, 3.18, 3.19, 3.22, 3.23, 3.28, 3.3; 382/100

(56) References Cited

U.S. PATENT DOCUMENTS 5,818,970 A    10/1998  Ishikawa et al. ............ 382/248
6,088,489 A    7/2000   Miyake ....................... 382/299
6,233,347 B1 * 5/2001   Chen et al. .................. 382/100
6,580,809 B2 * 6/2003   Stach et al. ................. 382/100
6,590,996 B1 * 7/2003   Reed et al. .................. 382/100

OTHER PUBLICATIONS

U.S. patent application Ser. No. 09/535,545; filed Mar. 27, 2000.
U.S. patent application Ser. No. 08/425,768; filed Apr. 20, 1995.
"Introduction To Special Issue On Processing Of Images For Bilevel Displays And The Generation Of Pseudo–Gray Scale", Proceedings Of The Society For Information Display, vol. 17, No. 2, Second Quarter 1976, p. 62.
"An Adaptive Algorithm For Spatial Greyscale", Proceedings Of The Society For Information Display, vol. 17, No. 2, Second Quarter 1976, pp. 75–77.

* cited by examiner

Primary Examiner—King Y. Poon
(74) Attorney, Agent, or Firm—Fitzpatrick, Cella, Harper & Scinto

(57) ABSTRACT

An image processor unit minimizes image-quality degradation that can be caused by the addition of predetermined information to an image and that enables the predetermined information to be added to the image so that embedded information can be accurately extracted. The image processor unit includes an input unit for inputting the image; a plurality of quantization-threshold setting unit, of which occurrence probability distributions are different from one another, for setting quantization thresholds in terms of probability; a control unit for controlling a regularity for selection of the plurality of quantization-threshold setting unit in units of a predetermined image region according to the predetermined information; and a quantizing unit that uses quantization thresholds set by the quantization-threshold setting unit and thereby quantizes the image according to an error diffusion method.

16 Claims, 21 Drawing Sheets

| b | b | c | c | c | c | a | a |
|---|---|---|---|---|---|---|---|
| c | c | c | c | a | a | b | b |
| c | c | a | a | b | b | c | c |
| a | a | b | b | c | c | c | c |
| b | b | c | c | c | c | a | a |
| c | c | c | c | a | a | b | b |
| c | c | a | a | b | b | c | c |
| a | a | b | b | c | c | c | c |

FIG. 6

| b | c | c | a | b | c | c | a |
|---|---|---|---|---|---|---|---|
| b | c | c | a | b | c | c | a |
| c | c | a | b | c | c | a | b |
| c | c | a | b | c | c | a | b |
| c | a | b | c | c | a | b | c |
| c | a | b | c | a | a | b | c |
| a | b | c | c | a | b | c | c |
| a | b | c | c | a | b | c | c |

FIG. 7

| b | b | c | c | c | c | a | a |
|---|---|---|---|---|---|---|---|
| c | c | c | c | a | a | b | b |
| c | c | a | a | b | b | c | c |
| a | a | b | b | c | c | c | c |
| b | b | c | c | c | c | a | a |
| c | c | c | c | a | a | b | b |
| c | c | a | a | b | b | c | c |
| a | a | b | b | c | c | c | c |

FIG. 13

| c | c | e | d | c | c | e | d |
|---|---|---|---|---|---|---|---|
| c | c | e | d | c | c | e | d |
| c | c | e | d | c | c | e | d |
| c | c | e | d | c | c | e | d |
| c | c | e | d | c | c | e | d |
| c | c | e | d | c | c | e | d |
| c | c | e | d | c | c | e | d |
| c | c | e | d | c | c | e | d |

FIG. 14

| f | f | f | f | f | f | g | g |
|---|---|---|---|---|---|---|---|
| f | f | f | f | g | g | f | f |
| f | f | g | g | f | f | f | f |
| g | g | f | f | f | f | f | f |
| f | f | f | f | f | f | g | g |
| f | f | f | f | g | g | f | f |
| f | f | g | g | f | f | f | f |
| g | g | f | f | f | f | f | f |

FIG. 16

| f | f | f | f | f | f | g | g |
|---|---|---|---|---|---|---|---|
| f | f | f | f | f | g | f | f |
| f | f | g | g | f | f | f | f |
| g | g | f | f | f | f | f | f |
| f | f | f | f | f | f | g | g |
| f | f | f | f | g | g | f | f |
| f | f | g | f | f | f | f | f |
| g | g | f | f | f | f | f | f |

FIG. 17

ID PROCESSOR WHICH CAN ADD
PREDETERMINED INFORMATION TO AN
IMAGE WHILE MINIMIZING IMAGE-
QUALITY DEGRADATION, AND METHODS
THEREFOR

This application is a continuation of and claims benefit under 35 U.S.C. § 120 of prior application Ser. No. 09/900,033, filed Jul. 9, 2001, and claims benefit under 35 U.S.C. § 119 of Japanese Application No. 209752/2000, filed Jul. 11, 2000.

BACKGROUND OF THE INVENTION

1. Field of the Invention

The present invention relates to an image processor unit, an image processing method, and a storage medium.

2. Description of the Related Art

Conventionally, studies have widely been made regarding the technique of multiplexing image-related additional information into video information. Recently, standardization is in progress for a technique called an "electronic translucent technique". According to the electronic translucent technique, video information, such as a photograph and a picture, is added by additional information. The additional information includes, for example, the name of the originator thereof and use-permission therefor. The additional information is multiplexed into the image so as not to be easily identified by the human eye. The image thus created is distributed via a network such as the Internet.

As one of other application fields, in advances in image outputting machines, such as photocopy reproducing machines and printers that are capable of outputting high quality images, techniques are developed to prevent illegal counterfeiting of, for example, paper money and revenue stamps. According to one of these techniques, additional information is embedded in an image so that an output machine and a serial number thereof can be identified from an image printed on paper. For example, additional information is embedded in a high frequency band for a low-visual-sensitive color difference component and color saturation, and the information is thereby multiplexed into an image.

However, the above-described techniques are problematic as described below. FIG. 19 illustrates embedding of general additional information according to an electronic translucent technique. Video information A and additional information B are multiplexed through an adder 1901, and are thereby changed to multiplexed information C. The illustration in FIG. 19 represents an example case in which additional information is multiplexed into a real space zone of video information. If the multiplexed information C can be distributed without performing image processing such as various filtering, and encoding such as nonreciprocal compression, the additional information B can easily be decoded from the multiplexed information C according to the conventional techniques. For video information distributed through the Internet, if it has some noise resistance, the decoding thereof can be performed through a digital filter capable of improving image quality in edge enhancement, smoothness, and the like.

However, a case is assumed in which a multiplexed image is printed by an output machine such as a printer, and additional information is retrieved from a printed object that has been output therefrom. In addition, the printer used in this case is assumed to have only the capacity of representing two or several tones in units of a single color.

In recent years, inkjet printers capable of representing several tones in color units are marketed. For example, one of the inkjet printers includes low-dye-density ink, controls the diameters of output dots so as to be variable, and thereby represents the tones. However, unless pseudo-gray-scale processing is performed, photograph-level image tones cannot be represented. Specifically, in the assumed case where the additional information multiplexed using the electronic translucent technique shown in FIG. 19 is output to the printer, as shown in FIG. 20, the multiplexed information C is changed to quantization information D according to a pseudo-gray-scale processing 2001. Subsequently, the quantization information D is printed by printer output 2002 on paper. Thereby, the input information is changed to on-paper information E (printed object) significantly degraded in quality.

Accordingly, the decoding of the additional information from the on-paper information to prevent the aforementioned counterfeiting is equivalent to the decoding of the additional information B from the on-paper information E subjected to series of the processing shown in FIG. 20. The amount of variations caused during the pseudo-gray-scale processing 2001 and the printer output 2002 are significantly great. The significantly grate variations make it difficult to perform multiplexing so that the additional information cannot be visually identified, the multiplexed additional information from the on-paper information.

FIG. 21 shows an example conventional electronic translucent technique in which video information is transformed into a frequency band instead of the real space zone by using, for example, a Fourier transformation method, and is synthesized with a high-frequency band. In the figure, video information is transformed by an orthogonal transformation processing 2101 into a frequency band, and additional information is added by an adder 2102 to a specific frequency that cannot be easily visually perceived. After the information is returned by reverse orthogonal transformation processing 2103 to a real space zone, it is passed through filters similar to those shown in FIG. 20, such as pseudo-gray-scale processing and printer output, which involves great variations.

FIG. 22 shows a procedure for separating additional information from paper. In the procedure, the information contained on the printed object is input through an image scanning unit, such as a scanner. Since the input information is represented in gradation according to the pseudo-gray-scale processing, it is subjected to reverse pseudo-gray-scale processing, that is, reproduction processing 2202. Generally, the reproduction processing 2202 uses a low pass filter (LPF). The decoded information is subjected to orthogonal transformation processing 2203. Then, separation processing 2204 is performed to separate at the additional information from a power having a specific frequency.

As is apparent from FIGS. 21 and 22, many complicated steps are performed to multiplex the additional information and to separate it. For a color image, the procedure additionally includes color conversion processing for converting colors to printer-specific colors. To implement favorable separation in the complicated procedure, a signal having a very high resistance needs to be input. However, to maintain high image quality, the input of highly-resistible signal is not suitable. In addition, the procedure including many complicated steps takes a long processing time for multiplexing the information and separating it.

In addition, the decoding tends to fail in the above-described technique. According to the technique, the information is added to a high frequency band through the information-multiplexing processing performed through the embedding of the additional information in the high frequency band of a low-visual-sensitive color difference component and color saturation. In the technique, however, in a case where an error diffusion method is executed in the latter pseudo-gray-scale processing, the band of the additional information is buried in the band of a texture developed during error-diffusion. This causes the decoding to fail. Furthermore, the decoding in the above-described technique requires a scanner unit capable of producing significantly high precision. Therefore, the method shown in FIGS. 20 and 21 is not suitable in the case where the pseudo-gray-scale processing needs to be performed as a prerequisite condition. In other words, the aforementioned case requires an additional-information multiplexing method that greatly relies on the characteristics of the pseudo-gray-scale processing.

Two techniques are described below by way of examples in which additional-information multiplexing and redundancy in pseudo-gray-scale processing are correlated.

According to the first technique, when an organizational dither method is performed for binary conversion, one of dither matrixes representing identical gradations is selected, and data is included in a video signal. However, according to the organizational dither method, without a printer capable of printing high resolution data and having high mechanical precision, it is difficult to output a photograph-level high quality image. This is because even a slight deviation in mechanical precision causes low frequency noises, such as lateral stripes that are easily developed to become visually identifiable on paper.

In addition, the dither matrix is periodically varied, the band of a specific frequency generated according to regularly arranged dithers is disordered, and the image quality is adversely affected thereby. The gradation representation capability significantly depends on the type of the dither matrix. Particularly, on paper, since variations in area ratio in dot-overlapped portions are different depending on the dither matrix, even in a region having a uniform density in terms of a signal, the density can be varied when the dither matrix is changed.

Furthermore, according to the decoding method wherein a dither matrix responsible for binary conversion is inferred in a state where pixel values of video information corresponding to an original signal is unknown, a decoding side (separating side) tends to perform erroneous decoding at a significantly high probability.

The second technique uses a color dither pattern method that performs the multiplexing of additional information into an image according to the arrangement of dither patterns. Also in this method, similarly to the first technique, degradation of image quality cannot be avoided. Compared to the first technique, in the second technique, while a greater amount of additional information can be multiplexed into the image, the color vision is varied according to variations in the arrangement of color components. Particularly, this increases the level of image-quality degradation in a flat portion. In addition, this method can further increase the difficulty in the decoding of on-paper information.

Either of the methods in which the dither matrix is changed is problematic in that, the image quality is significantly degraded, and in addition, the decoding is difficult.

In view of the above, the applicant of the present invention proposed a method in which combinations of quantization values that cannot be generated in ordinary pseudo-gray-scale processing is artificially created by using textures generated according to an error diffusion method, and symbols are thereby embedded.

According to this method, although microscopic variations slightly occur in the shape of the texture, the visual image quality is not deteriorated. In addition, when a method for changing a quantization threshold in an error diffusion method is used, since visual effects of area-degradation density values are maintained, multiplexing of a different-type signal can be implemented very easily.

However, according to the above-described proposal, a decoding side needs to determine as to whether or not the texture is artificial. For a printed object output onto paper, because of positional deviations, such as biases, from desired landing positions of dots, a case can occur in which the texture cannot be reproduced in a good condition. For a color image, the identification of a texture in a real space zone can easily be influenced by other color components, thereby making it difficult to separate multiplexed information.

For example, in a method developed to embed a significantly large amount of information, such as audio information, in an image, the audio information is converted into a dot code, which is a so-called two-dimensional barcode, and the dot code is printed in a marginal portion of the image or an interior portion of the image. However, in this method, the dot code and image information are not multiplexed as two different types of information, and the code is not processed so that it cannot be easily visually identified. As only example method for making it difficult to visually identify a code, a method in which a transparent paint is used to embed the code in an image has been proposed to date. However, since special ink is required, not only costs are increased, but also the quality of an image printed on paper is degraded as a matter of course.

SUMMARY OF THE INVENTION

Accordingly, an object of the present invention is to provide an image processor unit, an image processing method, and a storage medium with which at least one of the above-described problems can be solved.

Another object of the present invention is to provide an image processor unit, an image processing method, and a storage medium that minimize image-quality degradation that can be caused by the addition of predetermined information to an image and that enables the predetermined information to be added to an image so that information embedded in the image can be accurately extracted.

To achieve the aforementioned objects, the present invention provides an image processor unit for adding predetermined information to an image, as summarized below.

The image processor unit includes an input means for inputting the image; a plurality of quantization-threshold setting means, of which occurrence probability distributions are different from one another, for setting quantization thresholds in terms of probability; a control means for controlling a regularity for selection of the plurality of quantization-threshold setting means in units of a predetermined image region according to the predetermined information; and a quantizing means that uses quantization thresholds set by the quantization-threshold setting means and thereby quantizes the image according to an error diffusion method.

The present invention relates to an image processor unit, an image processing method, and a storage medium that have new functions.

Further objects, features and advantages of the present invention will become apparent from the following description of the preferred embodiments (with reference to the attached drawings).

BRIEF DESCRIPTION OF THE DRAWINGS

FIG. 6 shows an example regularity in the selection of a quantization-threshold setting means;

FIG. 7 shows an example regularity in the selection of a quantization-threshold setting means;

FIG. 13 shows an example regularity in the selection of a quantization-threshold setting means;

FIG. 14 shows an example regularity in the selection of a quantization-threshold setting means;

FIG. 16 shows an example regularity in the selection of a quantization-threshold setting means;

FIG. 17 shows an example changed state of the regularity shown in FIG. 16;

DETAILED DESCRIPTION OF THE PREFERRED EMBODIMENTS

Hereinbelow, referring to the accompanying drawing, preferred embodiments of the present invention will be described in detail. An image processor unit according to each of the embodiments effectively functions when it is included as a printer driver software or application software in a computer for creating video information to be output to a printer engine. In addition, the image processor unit effectively functions when it is included as hardware and software in a photocopy reproduction machine, a facsimile machine, or a printer body.

First Embodiment

Figure 1:
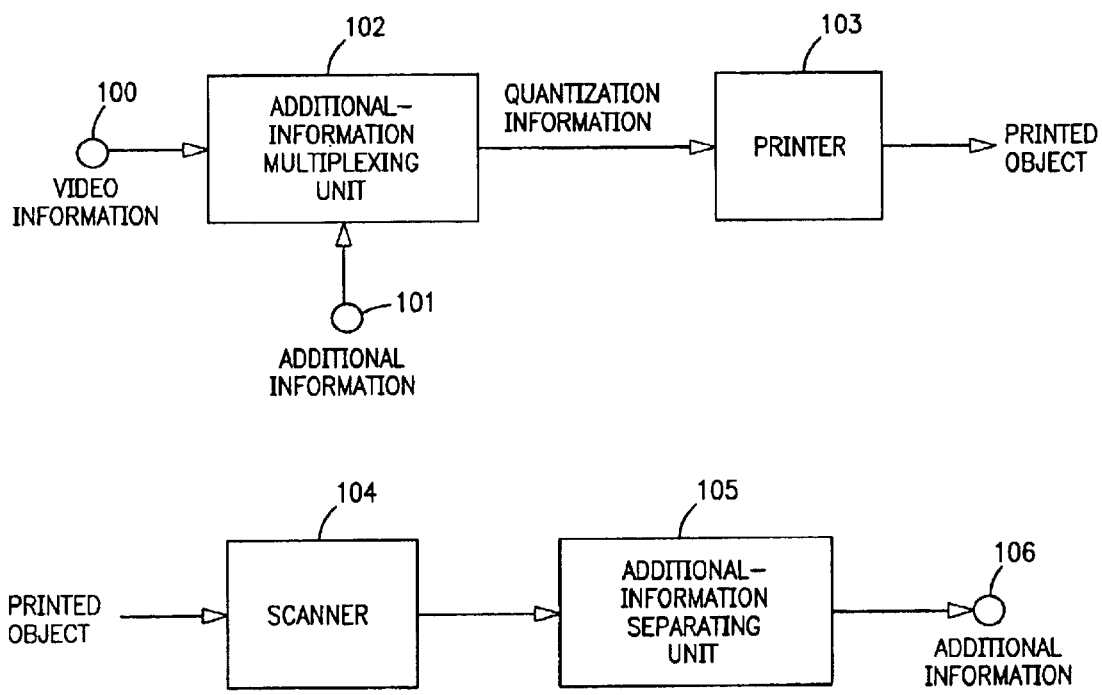
FIG. 1 is a block schematic view showing essential portions of an image processing system according to the present invention.

FIG. 1 is a block schematic view a configuration of an image processing system according to the present invention.

Either of reference numeral 100 and 101 denotes an input terminal. Multitone video information is input from the input terminal 100. Additional information to be embedded in the video information is input from the input terminal 101. For the additional information, various types of information can be considered. It includes information different from the video information input from the input terminal 100, for example, audio information, and textual document information; copyright information, a photographed date, a photographed site, and the name of a photographer regarding an image to be input from the input terminal 100; information regarding a machine for outputting the video information; and video information completely different from the aforementioned video information.

An additional-information multiplexing unit 102 embeds the additional information in the video information, making it difficult to be visually identified. The additional-information multiplexing unit 102 multiplexes the additional information, and concurrently, controls the quantization of the input multitone video information.

A printer 103 outputs information created by the additional-information multiplexing unit 102 to a printer engine. The printer 103 is assumed to be an inkjet printer or a laser printer that employs pseudo-gray-scale processing to implement tone representation.

To extract the additional information embedded in a printed object, first, a scanner 104 scans information contained in the printed object. Then, an additional-information separating unit 105 separates the additional information embedded in the printed object, and outputs the separated additional information to an output terminal 106.

Figure 2:
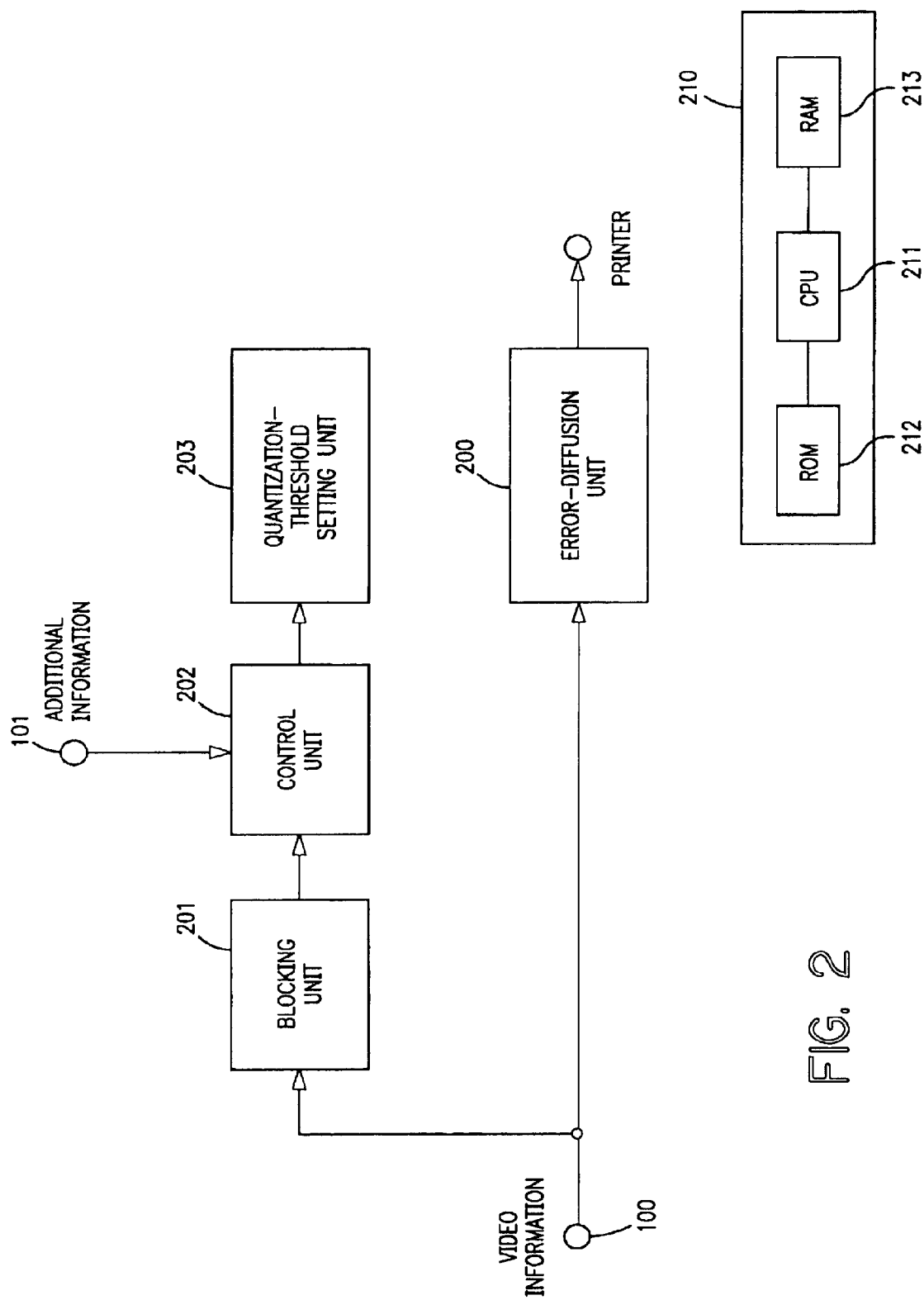
FIG. 2 is a block schematic view showing essential portions of an additional-information multiplexing unit shown in FIG. 1.

FIG. 2 is a block schematic view showing a configuration of the additional-information multiplexing unit 102 shown in FIG. 1.

An error-diffusion unit 200 performs the pseudo-gray-scale processing for the input video information according to an error diffusion method to thereby convert the information into quantization levels to be less than the number of input tones, and thereby represents area-wise tonality according to quantization values of a plurality of pixels. The error diffusion processing will be described below in detail.

A blocking unit 201 block-partitions the input video information in units of a predetermined region. The block-partitioning may be performed to form either regions each shaped rectangular or regions each shaped to be different from the rectangular.

According to the additional information input from the input terminal 101, a control unit 202 controls conditions for setting a quantization threshold in units of the region block-partitioned by the blocking unit 201.

According to the control performed by the control unit 202, a quantization-threshold setting unit 203 regularly selects a predetermined setting from a plurality of settings of quantization thresholds, and executes the selected setting.

The quantization-threshold setting unit 203 executes the setting of the quantization threshold in pixel units. According to the set quantization threshold, the error-spreading unit 200 executes quantization.

A control unit 210 is configured to include a central processing unit 211 (CPU), a read only memory 212 (ROM), and a random access memory 213 (RAM).

The CPU 211 controls operations and processing that are performed in the above-described configuration members according to a control program stored in the ROM 212. The RAM 213 is used as a work area for the CPU 211.

Figure 3:
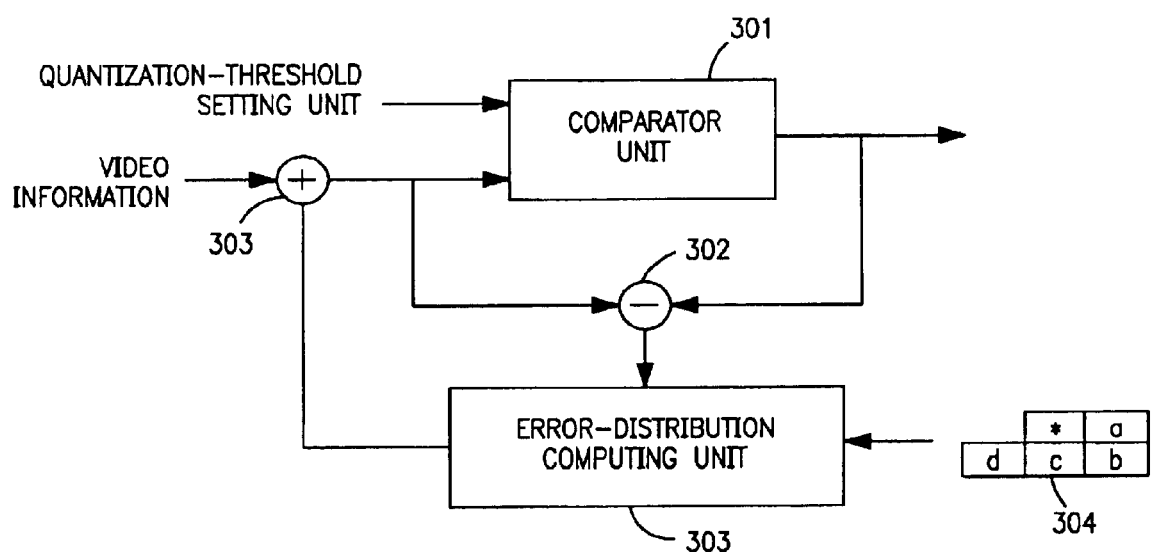
FIG. 3 is a block schematic view showing essential portions of an error-diffusion unit shown in FIG. 2.

FIG. 3 is a block schematic view showing the error-diffusion unit 200 in detail. General error diffusion processing is described in detail in the publication "An Adaptive Algorithm for Spatial Grayscale" (R. Floyed & L. Steinberg; SID Symposium of Paper; pp. 36 and 37; 1975).

Hereinbelow, by way of example, a description will be made regarding error diffusion processing in the case where the quantization value is represented by binary digits.

An adder 300 adds an attention pixel value in input video information and distributed quantization errors of peripheral pixels that have already been binary-converted. A comparator unit 301 compares the quantization threshold received from the quantization-threshold setting unit 203 and the addition result of errors. The comparator unit 301 outputs "1" if the addition result of errors is greater than the predetermined threshold, and outputs "0" in other cases. For example, when the tone of a pixel is to be represented with an eight-bit precision, generally, it is represented by the maximum value "255" and the minimum value "0". The description below assumes that when the quantization value is "1", a dot (of ink, toner, or the like) is printed on paper.

A subtracter 302 calculates the difference (error) between the quantization result and the aforementioned addition result. The error is distributed to peripheral pixels for which quantization processing will be performed according to an error-distribution computing unit 303. The error is distributed according to an error distribution ratio contained in a distribution table. The distribution table 304 is prepared to preserve distribution ratios of errors experimentally set according to distances relative to attention pixels.

A distribution table 304 shown in FIG. 3 contains distribution ratios for four peripheral pixels. However, the table is not limited thereto.

Hereinbelow, with reference to a flowchart shown in FIG. 4, a description will be made regarding the overall operation steps including those of the control unit 202 in an example case where the quantization value is binary-coded.

In step S401, variable i is initialized. The variable i is set in order to count vertical addresses.

In step S402, variable j is initialized. The variable j is set in order to count horizontal addresses.

Subsequently, step S403 makes a determination according to the address values i and j. Specifically, this step determines as to whether or not the coordinate of a current address i,j belongs to a region for which multiplexing is executed.

Figure 5:
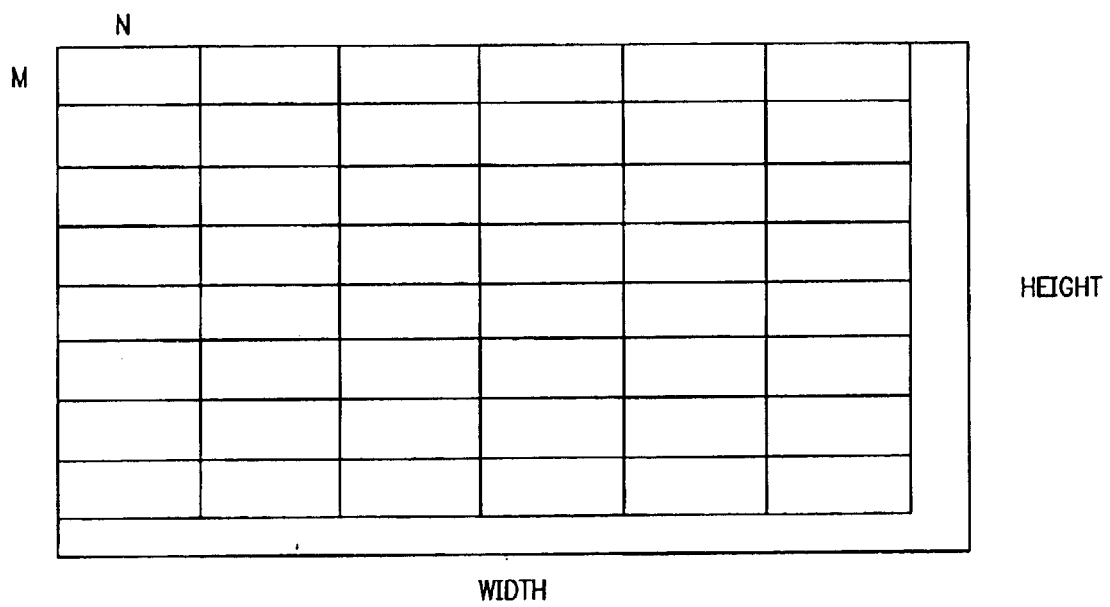
FIG. 5 shows example blocking-partitioning.

Hereinbelow, a multiplex region will be described with reference to FIG. 5 showing an image composed of pixels. In the figure, the number of horizontal pixels is represented by WIDTH, and the number of vertical pixels is represented by HEIGHT. Additional information is assumed to be multiplexed into an image. With the origin set to the upper left corner of the image, block-partitioning is performed on the basis of a horizontal pixel N and a vertical pixel M. In the present embodiment, the block-partitioning is performed with the origin as a reference point. However, the reference point may be set to an arbitrary point spaced from the origin. To multiplex the maximum information into the image, N×M blocks are arranged from the reference point. Specifically, when the number of blocks that can be horizontally aligned is represented by W, the number of blocks that can be vertically aligned is represented by H, the following relationships are established:

$$W=\text{INT}(\text{WIDTH}/N) \qquad \text{(Expression 1)}$$

$$W=\text{INT}(\text{HEIGHT}/N) \qquad \text{(Expression 2)}$$

In this case, INT( ) represents an integer part in ( ).

In Expressions 1 and 2, the remaining number of pixels, which cannot be divided, correspond to an edge portion in the case where a plurality of the N×M blocks are arranged, and belong to the outside of a code-multiplexing region.

Figure 4:
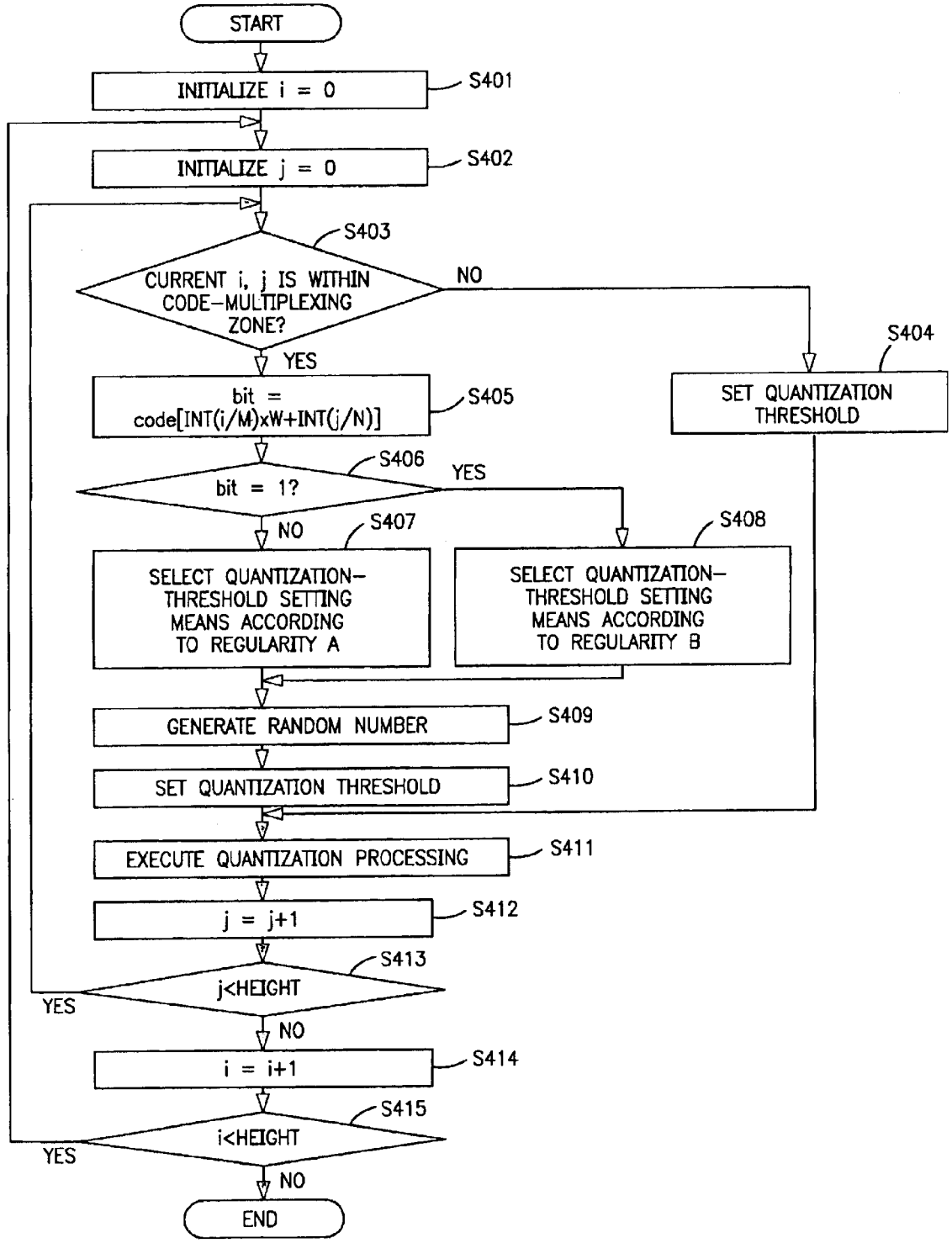
FIG. 4 is a flowchart showing operation steps in multiplexing processing including processing of a control means.

In step S403 shown in FIG. 4, when an attention pixel currently in process is determined to be the outside of the multiplexing region, a quantization threshold is set at step S404. In the example case, since the quantization threshold represents a region outside of the multiplexing region, any arbitrary value may be set. In the tone representation in eight-bit pixels, when the quantization level is represented by binary codes, although the maximum value "255" and the minimum value "0" are quantization representative values, the mean value "128" is set as the quantization threshold in many cases. However, in the error diffusion method, since average densities are preserved regardless of the level of the quantization value, even when a fixed value is set, the value is not limited to the aforementioned intermediate value between the quantization representative values. In addition, the value is not limited to the fixed value, but it may be set to a variable quantization value.

When the current attention pixel is determined to belong to the multiplexing region, additional information to be multiplexed is read. For the convenience of simplifying description, the additional information is assumed to be represented in units of one bit by using array "code[]". For example, when the additional information is assumed to have been composed of 48 bits, the array "code[]" ranging from code[0] to code[47] is stored in bit units. In step S405, for a variable "bit", the information in the array "code[]" is assigned as follows:

$$\text{bit}=\text{code}[\text{INT}(i/M) \times W + \text{INT}(j/N)] \qquad \text{(Expression 3)}$$

Subsequently, a determination is made as to whether or not the variable "bit" assigned in step S406 is "1". As described above, since the information in the array "code[]" is stored in bit units, the variable "bit" is set to one of the values "0" and "1". If the variable "bit" is determined to be "0", in step S407, a quantization-threshold setting means is selected according to a selection procedure of a regularity A. If the variable "bit" is determined to be "1", in step S408, a quantization-threshold setting means is selected according to a selection procedure of a regularity B.

Subsequently, in step S409, a random number is generated. Then, according to the generated random number, in step S410, the quantization value is set from the selected quantization-threshold setting means. Step S411 represents a quantizing means that performs quantization processing according to the set quantization value. This quantization processing corresponds to the error spreading method described with reference to FIG. 3.

Subsequently, in step S412, the value of the horizontal variable j is counted. Then, in step S413, a determination is made as to whether or not the value of the horizontal-pixel variable j is less than WIDTH, which represents the number of horizontal pixels of the image. The routing of the above-described processing is iterated until the number of processed pixels reaches the number represented by WIDTH. Upon completion of the horizontal-pixel processing for the number of horizontal pixels represented by WIDTH, in step S414, the value of the vertical-pixel variable i is counted. Subsequently, in step S415, a determination is made as to whether not the value of the variable j is less than HEIGHT, which represents the number of vertical pixels of the image. The routine of the above-described processing is iterated until the number of processed pixels reaches the number represented by HEIGHT.

Execution of the above-described operation steps enables the regularity for setting of the quantization value to be changed in units of the block formed of the N×M pixels.

Hereinbelow, a description will be made regarding examples of the aforementioned regularities A and B for the selection of the quantization-threshold setting means.

Since each of the regularities A and B is used in units of the block in the multiplexing region, difference in image quality need to be caused depending on the difference between the regularities A and B. However, the difference in image quality needs to be represented so that it cannot be easily visually identified, and concurrently, it can easily be separated from the image.

FIGS. 6 and 7 show examples of the regularities A and B, respectively. FIG. 6 shows selection periods of the quantization-threshold setting means in the regularity A. FIG. 7 shows selection periods for the quantization-threshold setting means in the regularity B.

In each of the figures, one box is assumed to represent one pixel, and the symbol in the box represents the type of the quantization-threshold setting means. Specifically, in each of FIGS. 6 and 7, regular arrangements are set for three types of the quantization-threshold setting means designated by reference symbols a, b, and c. In addition, each of the figures shows an example of an 8×8-pixel-based regularity (hereinbelow, the 8×8-pixel block defining a regularity is referred to as a small block). However, when the N×M-pixel block is equal to or larger than the 8×8-pixel block, the small block is repeated as a matter of course.

In each of the quantization-threshold setting means a, b, and c, a random number is generated, and the threshold is determined according to the generated random number. According to the allocation of the value of the random number to the number of conditions in units of a predetermined probability, an arbitrary probability distribution can easily be prepared.

For example, when random numbers from "0" to "9" are generated, a case where random number "0" is generated is set to a condition 1, and a case where a random number in the range of "1" to "9", is set to a condition 2. In addition, all the random numbers are assumed to be generated at the same probability. This arrangement allows an occurrence probability distribution to be obtained in which the condition 1 occurs at a probability of 10%, and the condition 2 occurs at a probability of 90%.

Figure 8A:
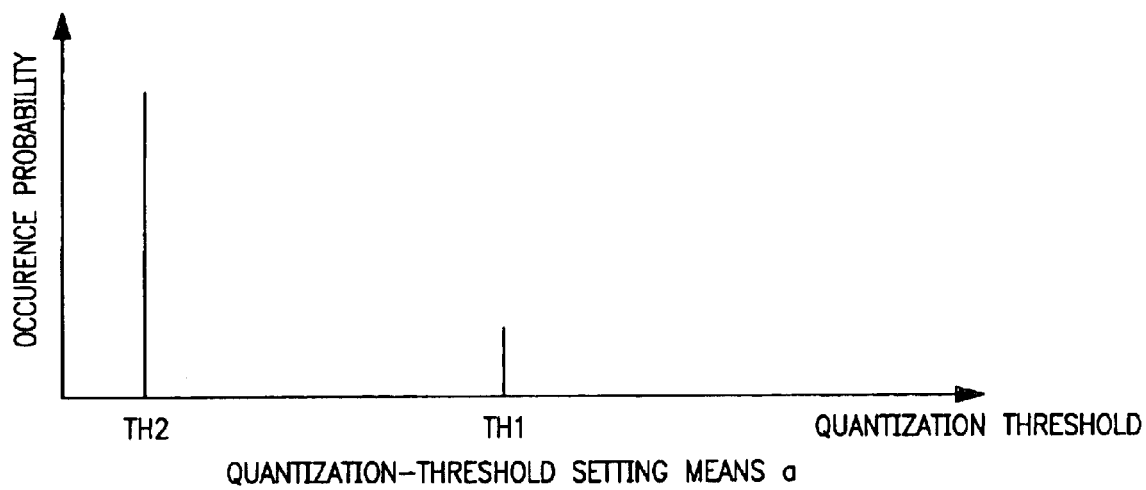
FIGS. 8A to 8C each show an example occurrence probability distribution of a quantization-threshold setting means.
Figure 8B:
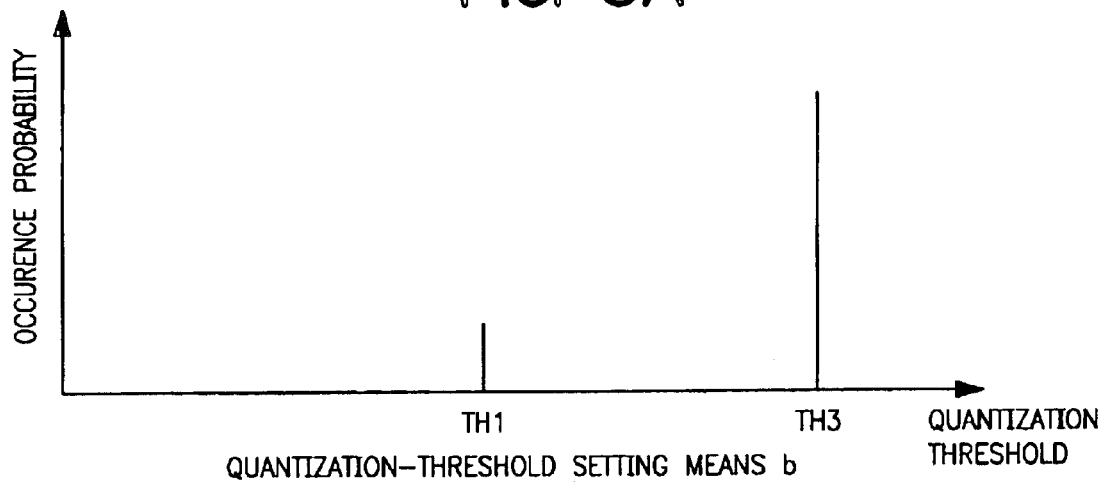
Figure 8C:
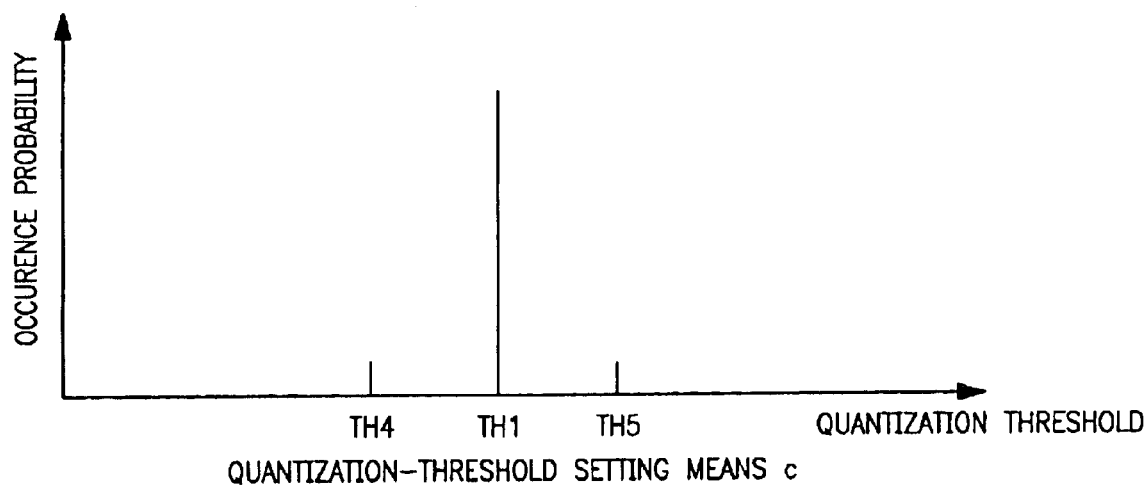

FIGS. 8A to 8C each show the state of an occurrence probability distribution in each of the quantization-threshold setting means a, b, and c.

In FIG. 8A, setting is performed so as to produce a probability distribution in which a probability of 20% is distributed to TH1, and a probability of 80% is distributed to TH2. In FIG. 8B, setting is performed so as to produce a probability distribution in which a probability of 20% is distributed to TH1, and a probability of 80% is distributed to TH3. In FIG. 8c, setting is performed to produce a probability distribution in which a probability of 80% is distributed to TH1, a probability of 10% is distributed to TH4, and a probability of 10% is distributed to TH5. In this case, TH1 is assumed to represent the intermediate value between the quantization representative values (the intermediate value corresponds to "128" in the tone representation in pixels each formed of eight bits).

When the respective probability distributions of the quantization-threshold setting means a, b, and c are represented by FIGS. 8A, 8B, and 8C, under the control employing one of the regularities A and B, quantization results individually have a discrete regularity. In the quantization-threshold setting means a, since the quantization value is set to a value less than the intermediate value between the quantization representative values at a probability of 80%, an attention pixel at the time of the quantization-threshold setting means a tends to have the quantization value "1" (quantization representative value "255"). Specifically, in the arrangement of the quantization-threshold setting means a in each of FIGS. 6 and 7, the quantization values "1" tend to be chained in series. In the regularities A and B, since the arrangements of the setting means are differentiated, and the angles at which the quantization values "1" tend to be chained are differentiated. Thereby, differences in the feature index are caused in local portions of the relevant images.

Conversely, in the quantization-threshold setting means b, since the quantization value is set to a value greater than the intermediate value between the quantization representative values at a probability of 80%, an attention pixel at the time of the quantization-threshold setting means b tends to have the quantization value "0" (quantization representative value "0"). Specifically, in the arrangement of the quantization-threshold setting means a in each of FIGS. 6 and 7, the quantization values "0" tend to be chained in series. Therefore, similarly to the case of the quantization-threshold setting means a, differences in the feature index are caused in local portions of the relevant images.

In the quantization-threshold setting means c, TH1 is set to the intermediate value at a probability of 80%, and the quantization value is changed by a probability of 10% to each of the higher and lower sides. This setting manner provides the advantage of causing irregularities.

An advantage similar to the above of causing irregularities can be obtained in each of the cases of the quantization-threshold setting means a and b. That is, TH1 is selected at the predetermined probability. This setting manner prevents the arrangement of the quantization representative value according to the regularity A or B to be c is faithfully implemented. That is, the regularity is disordered at a predetermined probability to thereby avoid artificially created unnatural dot chains.

The present invention is made by aiming at the redundancy of the error diffusion method.

In the error diffusion method, an attention-pixel quantization error is sufficiently fed back through spreading to peripheral pixels. A change in the quantization value in the error diffusion method locally affects image quality as in a case where the arrangement of dots is slightly changed, and variations occur in the generation of textures. However, since a feedback system effectively functions, the overall image quality in the tone representation is not substantially influenced. Compared thereto, in the organizational dither method, since the tone representation is solely performed according to the arrangement of quantization values, the variation in the image quality according to the difference between dither patterns is increased.

Frequency characteristics of a quantization filter in the error diffusion method include the characteristics of a wideband high pass filter. Therefore, the regularity in additional information is arranged to somewhat resemble the characteristics of a noise generated during error-diffusion. Thereby, the regularity is assumed to be handled as a texture generated in the error diffusion method, and components of a signal to be added can thereby be camouflaged. This corresponds to an arrangement in which a part of power that corresponds to a regular low-frequency-band noise artificially created is somewhat changed to a white noise to spread a noise. This can be achieved only with the error diffusion method.

Hereinbelow, a description will be made regarding the additional-information separating unit 105.

Figure 9:
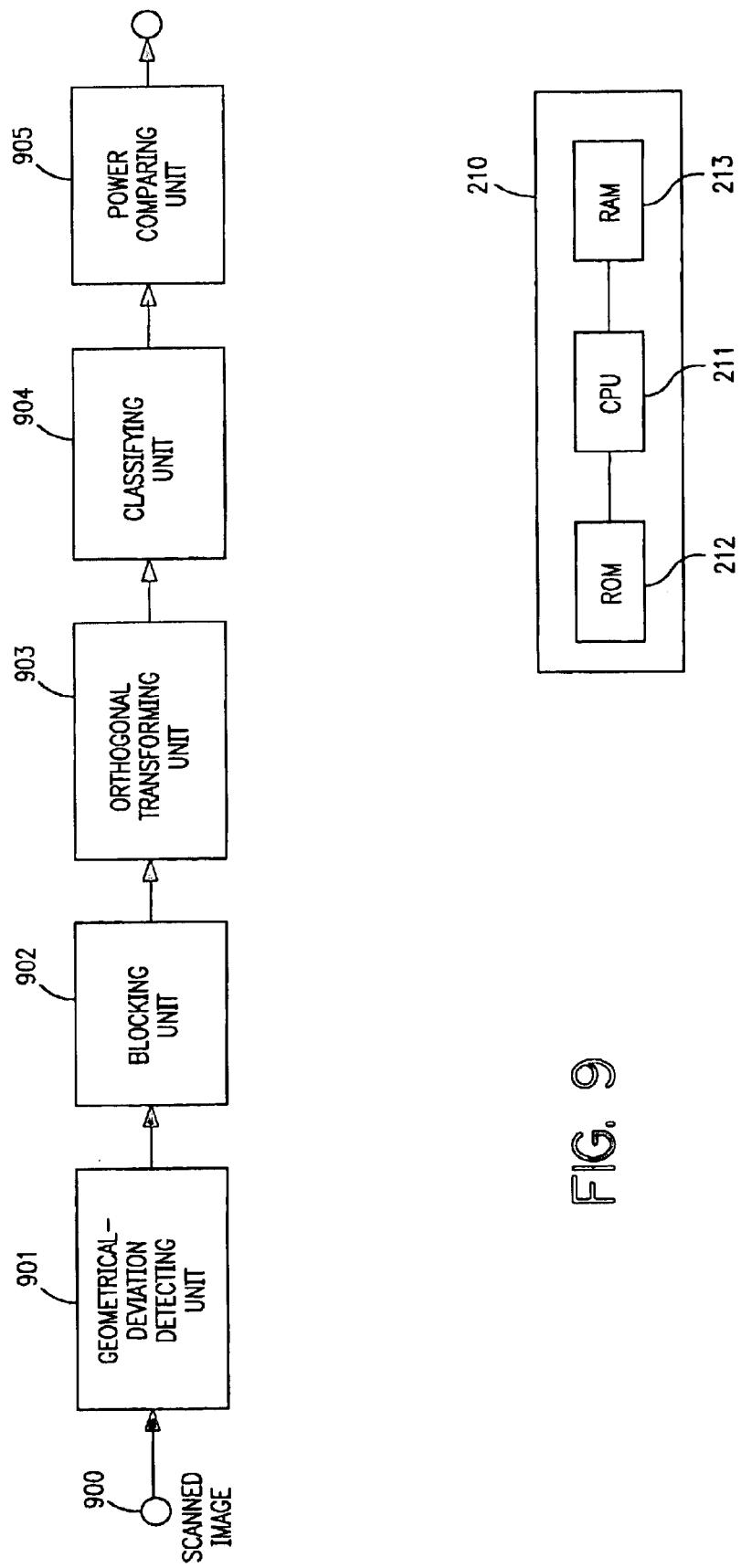
FIG. 9 is a block schematic view showing essential portions of an additional-information separating unit shown in FIG. 1.

FIG. 9 is a block schematic view showing a configuration of the additional-information separating unit 105. An input terminal 900 inputs video information scanned by a scanner. The resolution of the scanner to be used is preferably equal to or higher than the resolution of a printer used to create a printed object. As a matter of course, to accurately scan the information represented by scattered dots on the printed object, according to a sampling theorem, the scanner side needs to have a resolution that is at least two times as high as that of the printer side. However, with a resolution equal to or higher than that of the printer side, the scanner can identify scattered dots to a certain extent while the result somewhat lacks accuracy. For the convenience of simplifying description, in the present embodiment, the printer resolution is assumed to be the same as the scanner resolution.

A geometrical-deviation detecting unit 901 detects a geometrical deviation in the image input from the scanner. As a matter of course, since the video information to be transferred has passed through the processing of printer output and scanner input, a case can occur in which the video information is significantly geometrically deviated from the pre-printer-output video information. In view of the problem, the geometrical-deviation detecting unit 901 is provided to detect four edge portions in which the video information in the printed object is assumed to have been printed. In the configuration wherein the printer resolution and the scanner resolution are the same, slant lines caused when the information is recorded by the printer on paper, and deviations caused when the printed object is set on the scanner become important factors for correction of deviations (skews) in the rotational directions of the image. Therefore, according to the detection of the four edge portions, a determination can be made for the level of the deviation in the rotational direction.

A blocking unit 902 performs block-partitioning in units of P×Q pixels. A block formed by the blocking unit 902 needs to be smaller than that block-partitioned in the N×M-pixel units at the time of multiplexing. That is, the following relationship is established:

$P \leq N$, and concurrently, $Q \leq M$ (Expression 4)

The P×Q-pixel-based block-partitioning skippingly forms blocks at predetermined intervals. Specifically, the block-partitioning is performed so as to include one of the P×Q-pixel-based blocks in a region where the N×M-pixel-based blocks at the time of multiplexing are assumed to be formed. The number of skipped pixels is based on the number of the horizontal N pixels and the number of the vertical M pixels.

The amount of a deviation detected by the geometrical-deviation detecting unit 901 is divided by the number of the blocks to obtain the amount of a deviation per block. Then, the resultant amount of the deviation is added to the number of the skipped pixels. In this way, the deviation needs to be corrected.

Figure 10:
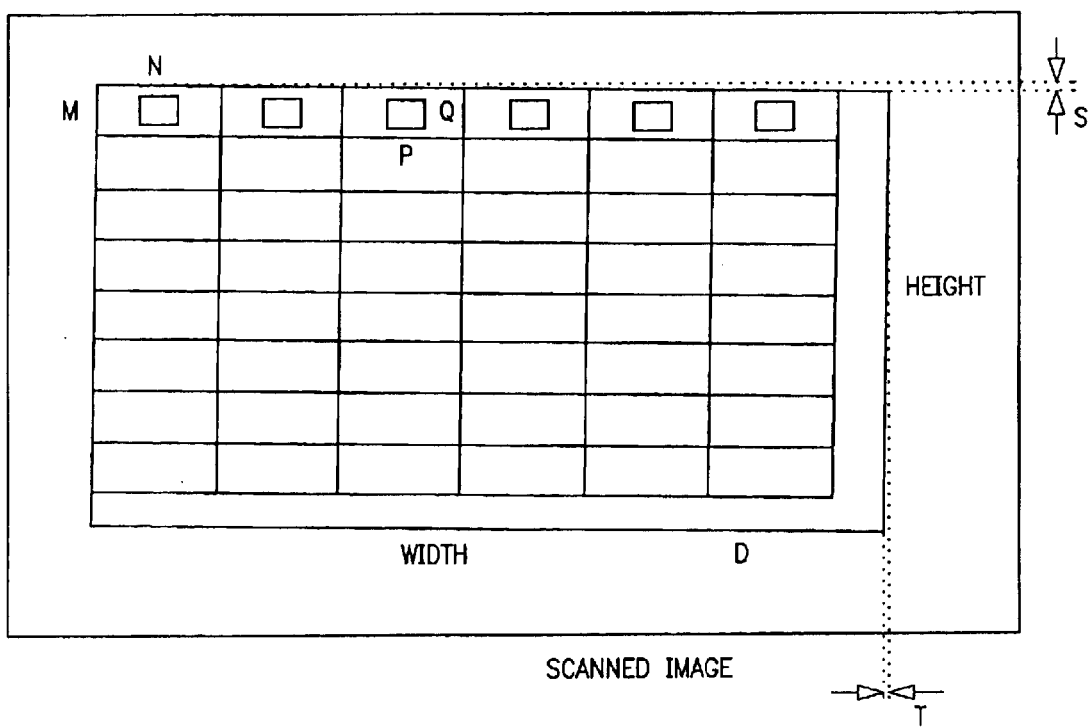
FIG. 10 is an explanatory view of a skewed image in a scanned image.

FIG. 10 illustrates the correction in the amount of a deviation, and block-partitioning processing. In the figure, the largest rectangular region represents a scanned image transferred from the scanner. A region D shown by a bold line in the largest rectangular region represents a printed image portion (where printing is assumed to have been performed). The deviation in the rotational direction of the video information can be determined by detecting four edge portions of the printed image portion D. The detection of the edge portions can be performed in a method in which markers indicating the edge portions are preliminary recorded at the time of printing. Alternatively, the detection is performed based on the difference in density between a white portion and the printed portion of the paper. When the horizontal deviation is represented by T, and the vertical deviation is represented by S, the amounts of the deviations (T' and S') are calculated through the following expressions:

$T' = T \times M / \text{HEIGHT}$ (Expression 5)

$S' = S \times N / \text{WIDTH}$ (Expression 6)

A small rectangular region shown by a bold line represents a block formed through the P×Q-pixel-based block-partitioning. For the convenience of simplifying description, the figure shows only the upper first line subjected to the block-partitioning. According to the corrective block-partitioning using Expressions 5 and 6, individual block-partitioning start positions are controlled to include one of the P×Q-pixel-based blocks in a region where the N×M-pixel-based blocks at the time of multiplexing are assumed to be formed. Thereby, the "deviations" detected by the geometrical-deviation detecting unit 901 are corrected.

An orthogonal transforming unit 903 orthogonally transforms the block-partitioned P×Q pixels. In this case, to perform a two-dimensional orthogonal transformation, the block-partitioning needs to be performed for a square block (P=Q). By way of example, the present embodiment employs a discrete cosign transformation (DCT).

A two-dimensional DCT coefficient for a P×P-pixel-based block is given through the expression shown below.

When $C(x) = 1/\sqrt{2}(x=0)$, $C(x) = 1(x \neq 0)$ (Expression 7)

Figure 11:
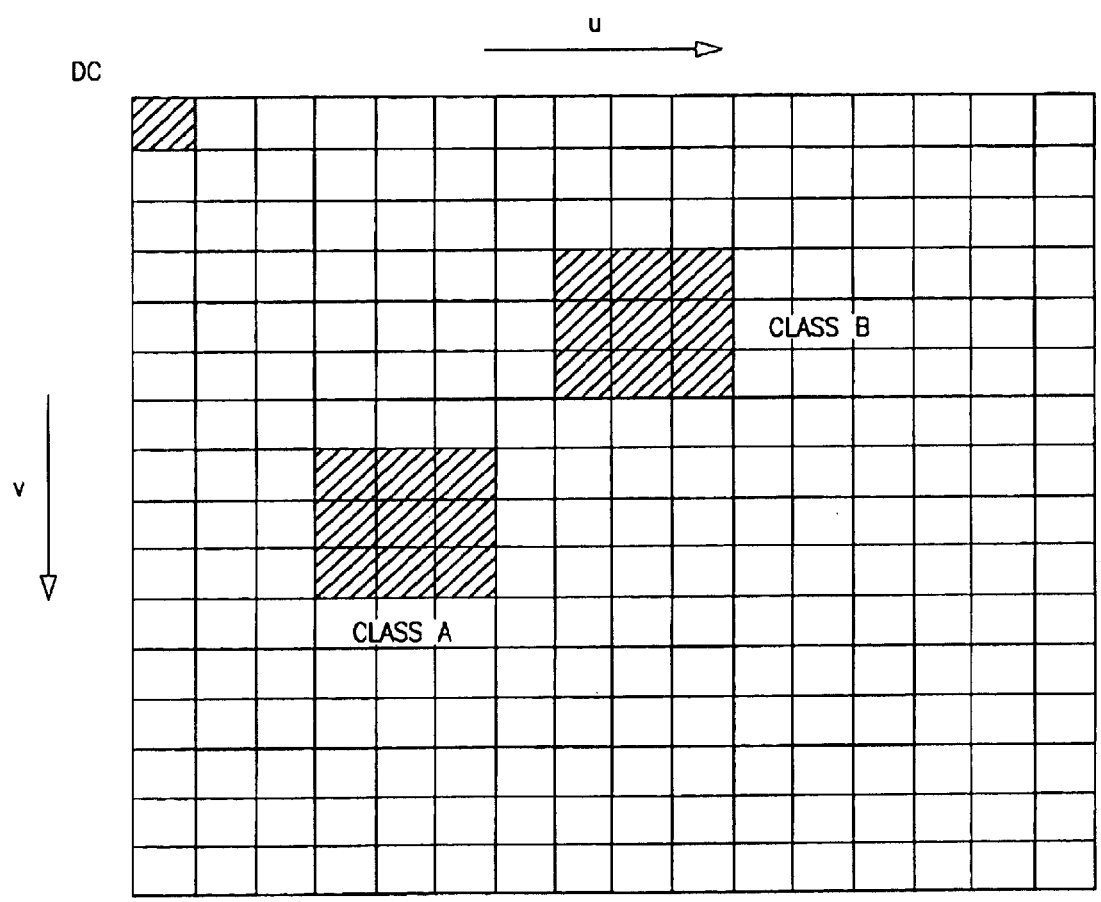
FIG. 11 shows example classification in an orthogonally transformed block.

A classifying unit 904 performs classification in units of a band of the DCT coefficient. FIG. 11 shows a DCT coefficient F(u,v) in one block, wherein the upper-left corner portion represents a DC component, and other 256 components are AC components. In the example case, two classes are created. One of the classes is a class A having the center at F(4,8), and the other is a class B having the center at F(8,4). The two classes are shown by bold lines in the figure. The classifying unit 904 need not be controlled to perform the classification for all the 256 components, but may be controlled perform the classification to create a plurality of classes each having the center at a desired component. The number of the necessary classes corresponds to the number of the conditions subjected to the quantization control at the time of multiplexing. Therefore, the number of the classes does not exceed the number of the conditions subjected to the quantization control.

A power-comparing unit 905 compares the total amounts of powers in the individual classes. To speed up the computations, absolute values of the generated transformation coefficients may be used instead of the amounts of powers. According to the comparison of the total amounts of powers in the individual classes, a signal for representing the additional information is determined.

Hereinbelow, a description will be made regarding examples wherein the regularities A and B shown in FIGS. 6 and 7 are applied. As already described in the above, in each of the quantization-threshold setting units using the regularity A or B, textures individually formed of dots aligned in the slant direction at different angles tend to occur. Therefore, in the block quantized according to the regularity A, when the orthogonal transformation processing is executed, a high power is generated in the class A shown in FIG. 11. Similarly, in the block quantized according to the regularity B, when the orthogonal transformation processing is executed, a high power is generated in the class B shown in FIG. 11. Therefore, through the comparison of the relationship between the power levels in the classes A and B, a determination can be made as to which one of the regularities A and B corresponds to the regularity of a block in the process of multiplexing. Since the regularity is connected to the code of the additional information ("bit" in Expression 3), the case where the regularity can be identified is equivalent to a case where the multiplexed code can be specified.

In the example shown in the flowchart shown in FIG. 4, "bit=0" is set to the regularity A, and "bit=1" is set to the regularity B. Therefore, when the power of the class A is relatively higher, a determination can be made to be "bit=0". Also, when the power of the class B is relatively higher, a determination can be made to be "bit=1".

As described above, in the quantization according to the error diffusion method, the filter itself in the error diffusion method has characteristics of a high pass filter, which passes high frequency bands. Therefore, with a transformation coefficient in a state after ordinary quantization, powers in regularities A and B, which are in a low intermediate frequency band, are reduced. The power reduction allows the above-described determination to be made. If the power in the low intermediate frequency band is relatively higher, the high power can be assumed to have been generated because of control artificially performed for the quantization condition. Therefore, according to the control performed to change the regularity in the changing period of the quantization condition, a desired high power can be generated substantially without being visually identified. In the present embodiment, two types of regularity control are performed during multiplexing for the regularities A and B, and two types of the classification are performed during the separation for the classes A and B. These are examples where the additional information in the block is composed of a single bit. However, as a matter of course, through control for a larger number of regularities, a larger number of types of classification can be performed.

Different from the conventional example, the information need not be orthogonally transformed during the multiplexing so as to be embedded. Simply by changing the regularity in the quantization-condition selection, biases in the postquantization frequency are created. In addition, the frequency biases are mixed with high-frequency components generated in the error diffusion method, they cannot be easily visually identified. Moreover, since the information is multiplexed during quantization immediately before the information is transferred to the printer, the printer precision is thereby increased.

In the present embodiment described above, however, since the block-partitioned image is skewed greater in proportion to the size of the geometrical deviation, the frequency is deviated from a desired frequency. For example, even in the case where the information is multiplexed so that a higher power is generated at $F(4,8)$, when the image is skewed, as a matter of course, even the frequency is deviated from $F(4,8)$. Therefore, a configuration can be considered in which the classification configuration is dynamically varied according to the amount of geometrical deviation. As a matter of course, if the amount of deviation is small, the classification may be such that one class is formed only of one component.

Although the means of orthogonally transformation has been described with reference to the DCT by way of example, the present embodiment is not limited thereby. As a matter of course, the present embodiment may use a different transformation method, such as an Adamarl transformation method, a Fourier transformation method, and a wavelet transformation method.

Since the regularities A and B in the selection step for the quantization-threshold setting means and the classes A and B are only examples, the present embodiment is not limited thereby. As a matter of course, other types of regularities may be used. For changing the quantization-threshold setting means, for example, a counter may be used to change the horizontal and vertical periods. Alternatively, tables in which regularities are preset may be prepared so as to be changed for use.

By way of example, the quantization has been described with reference to binary conversion. However, the present embodiment is not limited thereby.

Figure 12A:
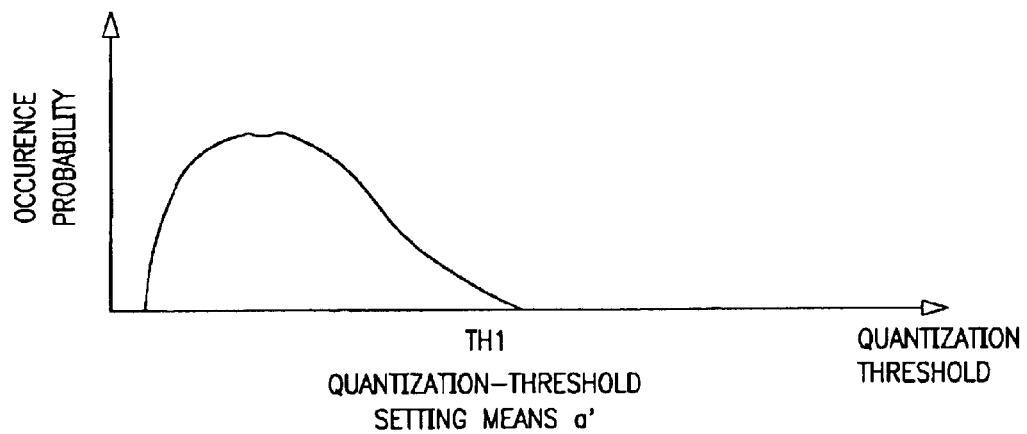
FIGS. 12A to 12C each show an example occurrence probability distribution of a quantization-threshold setting means.
Figure 12B:
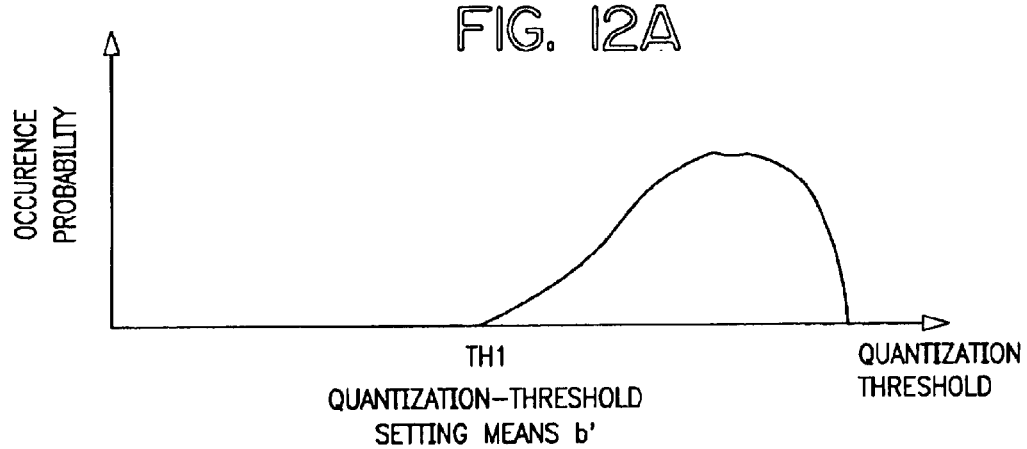
Figure 12C:
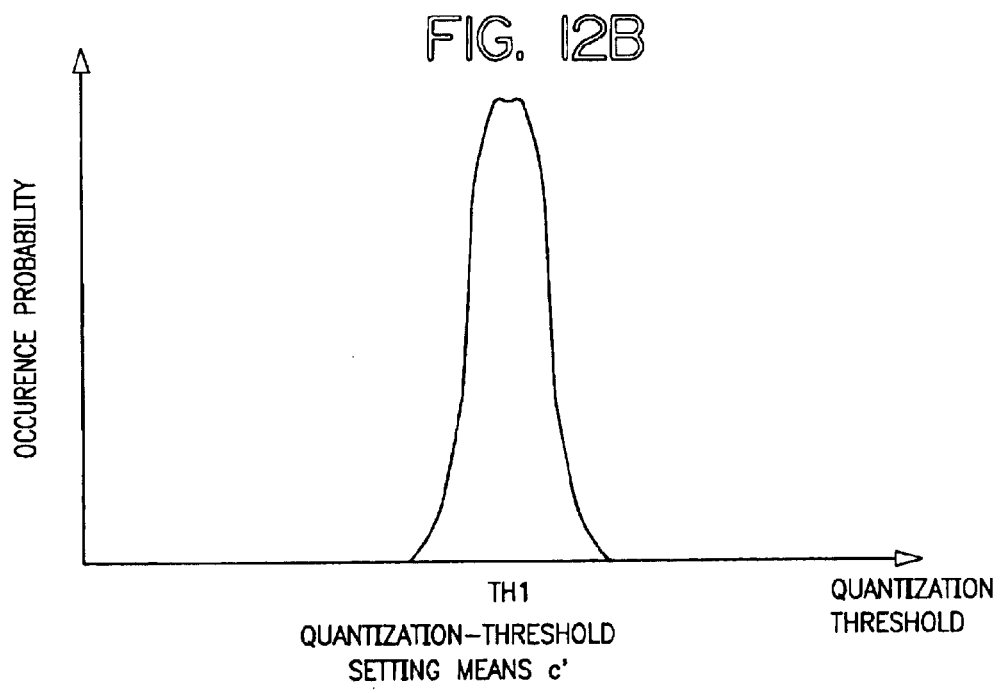

The occurrence probability distribution of the quantization-threshold setting means has been described by exhibiting a simple method that changes the quantization value. However, as a matter of course, the distribution is not limited thereto. For example, FIGS. 12A, 12B, and 12C show example quantization-threshold setting means a', b', and c', respectively, which correspond to the quantization-threshold setting means a, b, and c. Different from the examples shown in FIGS. 8A to 8C, in each of the examples shown in FIGS. 12A to 12C, quantization thresholds can be continually set. In this case, a method can be considered in which the quantization-threshold setting means a', b', and c' are preserved in a table to enable predetermined distributions to be achieved.

In addition, a method can easily be implemented such that a random number is not used only to change the quantization threshold, but operations such as addition, subtraction, multiplication, and exponentiation, are performed for a generated random number, and a quantization threshold can be calculated in a flexible manner according to the operation result.

In the present embodiment, as an indispensable condition, the probability distributions of the threshold generation for the quantization-threshold setting means are greatly different from one another. In at least one of the plural quantization-threshold setting means, the intermediate value of the probability distributions must be other than the intermediate value between the quantization representative values. Preferably, in the configuration in which three or more types of quantization-threshold setting means are used, at least one of the intermediate values of the probability distributions therefor is greater than an intermediate value between the quantization representative values. Concurrently, at least one of them is preferably less than the intermediate value between the quantization representative values.

The design of the probability distributions relates to the design of image quality of a printed object output after additional information is multiplexed. Therefore, preferably, the probability distributions are prepared based on experiments.

A still another example is conceivable. The example is arranged to be different from the above-described embodiment such that, according to the code for additional information, not only the regularity in the selection of the quantization-threshold setting means is changed, but the combination of the quantization-threshold setting means is also changed.

Hereinbelow, the above example arrangement is described with reference to FIGS. 13 and 14. Similarly to FIG. 6, FIG. 13 shows a regularity A in the selection of a quantization-threshold setting means. Also, FIG. 14 shows a quantization-threshold setting means c. Assumption is made such that, according to the code for the additional information, quantization-threshold setting means is selected in two ways by using the regularities A and C. In the above-described embodiment, only the regularities are different from one another. However, in this particular case, combinations of the quantization-threshold setting means are also different from one another. Specifically, while the combination in the regularity A is made among the quantization-threshold setting means a, b, and c, the combination in the regularity C is made among the quantization-threshold setting means c, d, and e.

Figure 15A:
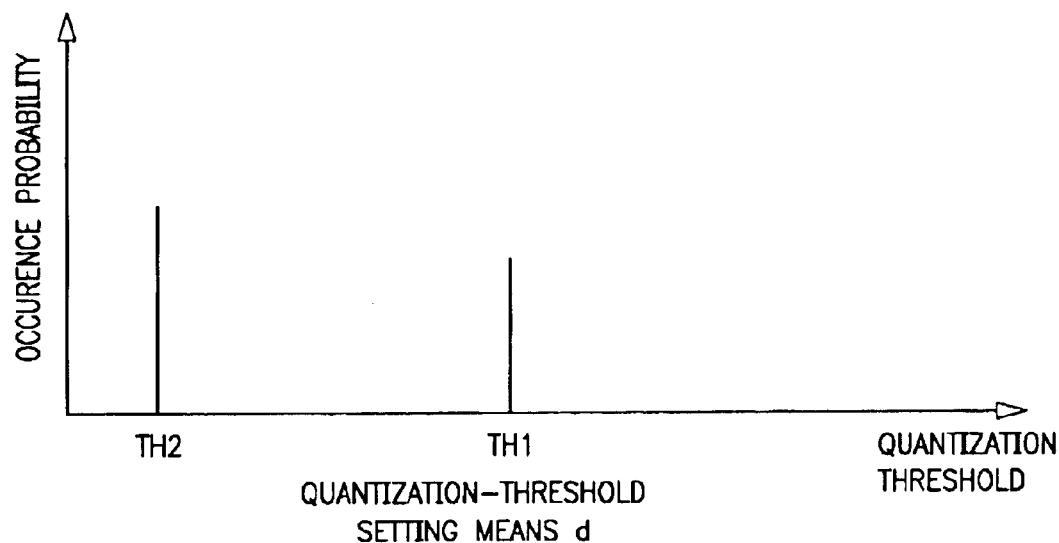
FIGS. 15A and 15B each show an example occurrence probability distribution of a quantization-threshold setting means.
Figure 15B:
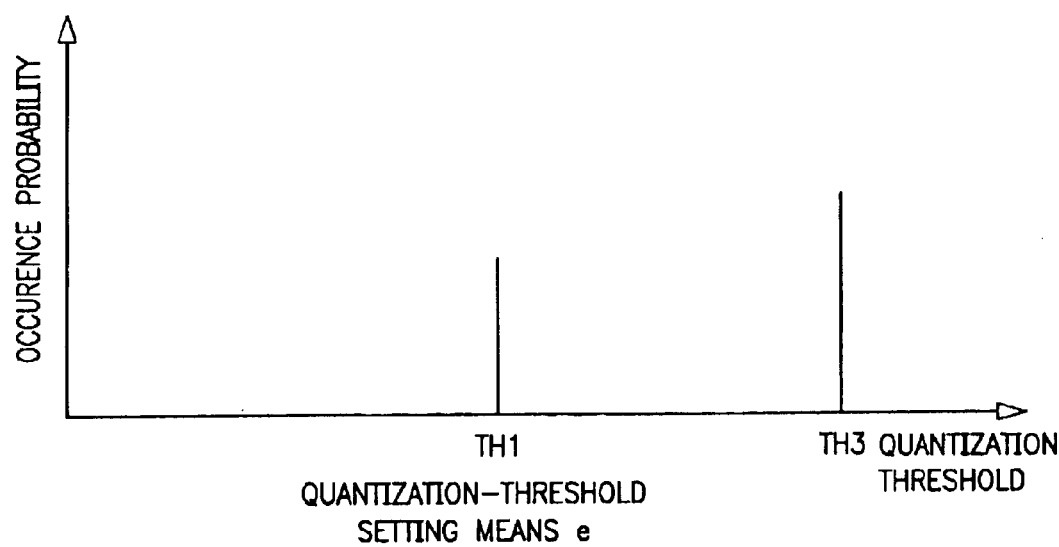

FIG. 15A shows the quantization-threshold setting means d. FIG. 15B shows the quantization-threshold setting means e. Compared to the probability distributions of the quantization-threshold setting means a and b shown in FIGS. 8A and 8B, the biases in the probability distribution of TH1 and TH2 and of TH1 and TH3 are less.

Specifically, compared to the arrangement in the regularity C, in the regularity A, since the arrangement is vertical, noise tends to be recognized. In addition, when dots are vertically chained, they adversely affect the visual image quality.

In view of the above problem, in each of the quantization-threshold setting means d and e, the probability at which the quantization value is set to TH1 is increased to be greater than that in each of the quantization-threshold setting means a and b. Thereby, the probability at which dots are vertically chained is minimized. However, when vertical dot chains are completely eliminated, the power value of a frequency desired for separation is reduced. Therefore, as described above, the probability distributions need to be designed to be most suitable based on experiments.

In the present embodiment, depending on the code for additional information, the probability distribution can be flexibly designed. For example, the probability distribution can be designed such that the regularity thereof is either conspicuous or inconspicuous.

In addition, a method in which the arrangement having a specific regularity is changed according to random numbers can be considered.

In all the above-described examples, the quantization-threshold setting means is arranged according to the predetermined regularity. Also random numbers are used for occurrence probabilities of the quantization thresholds in the quantization-threshold setting means. However, when the threshold is set in terms of probability according to a random number, although the probability macroscopically approximates to a set probability, it does not assuredly reach a desired probability in many cases when viewed in block units. Consequently, for example, problematic cases can occur in which regular noise becomes conspicuous in a block, and the regularity is completely lost to thereby disable the separation of additional information. In view of these problematic cases, a method can be considered in which control is performed so that a desired probability can be obtained either in units of the block that multiplexes the additional information or in units of the small block that defines the regularity.

An example of the above method will be described below with reference to FIGS. 16 and 17.

Figure 18A:
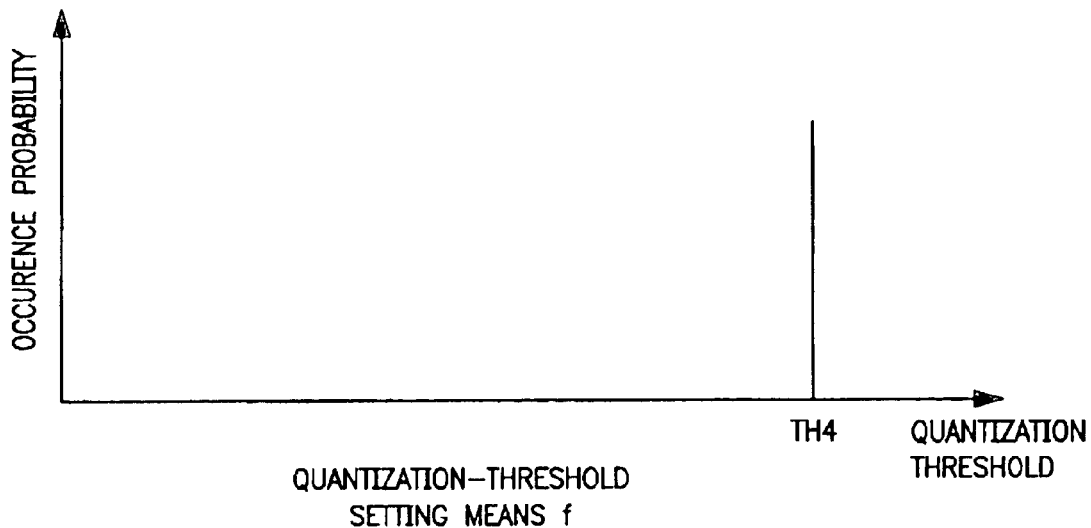
FIGS. 18A and 18B each show an example occurrence probability distribution of a quantization-threshold setting means.
Figure 18B:
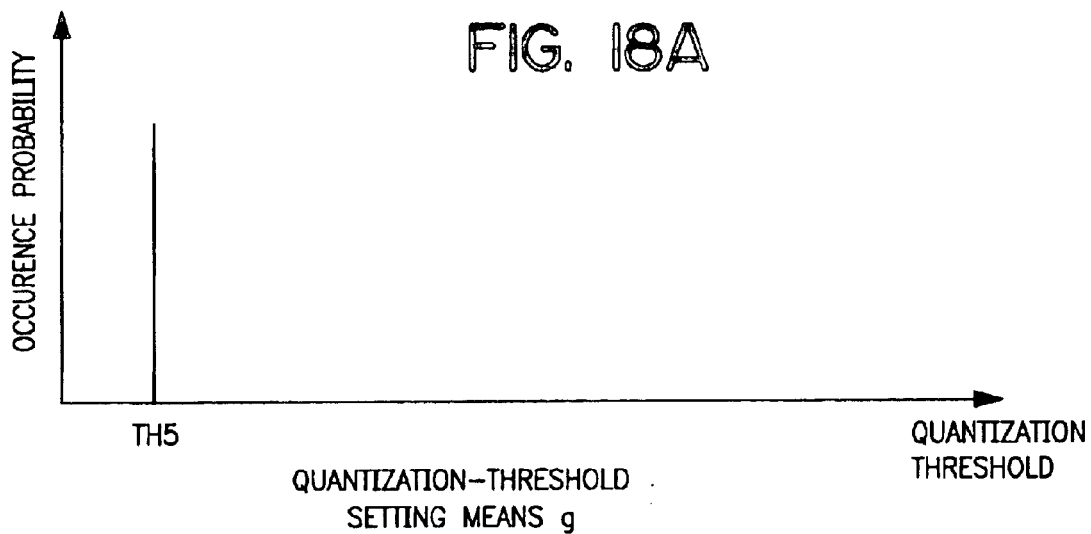
Figure 19:
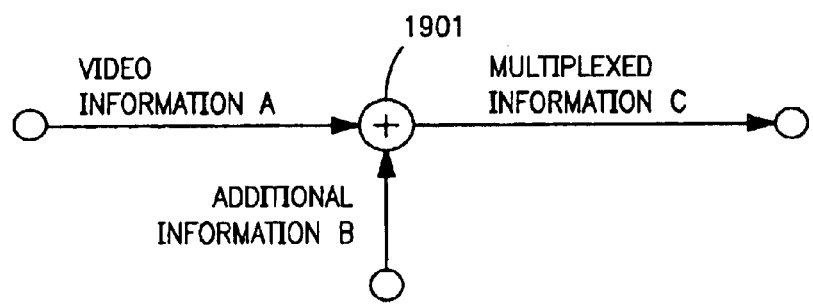
FIG. 19 is a schematic view showing an example conventional multiplexing method.
Figure 20:
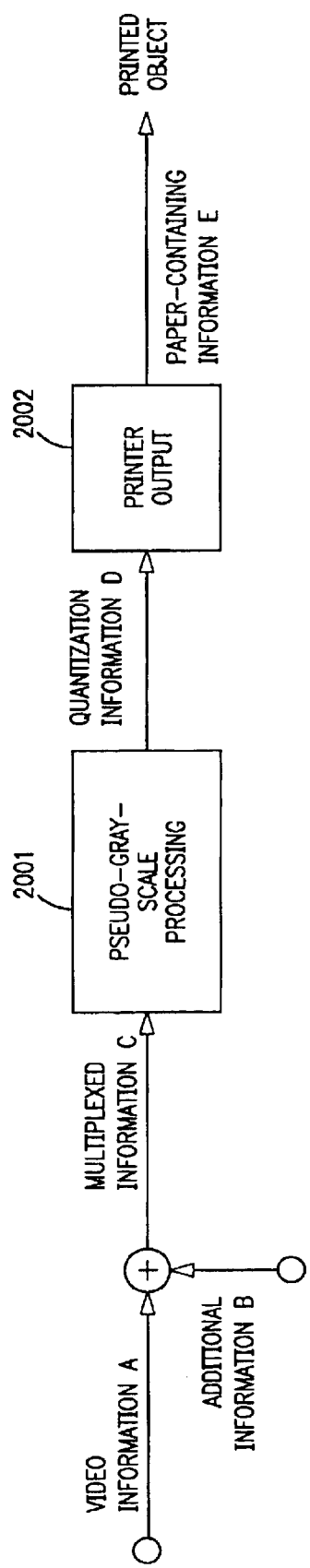
FIG. 20 is a block schematic view showing an example conventional multiplexing method.
Figure 21:
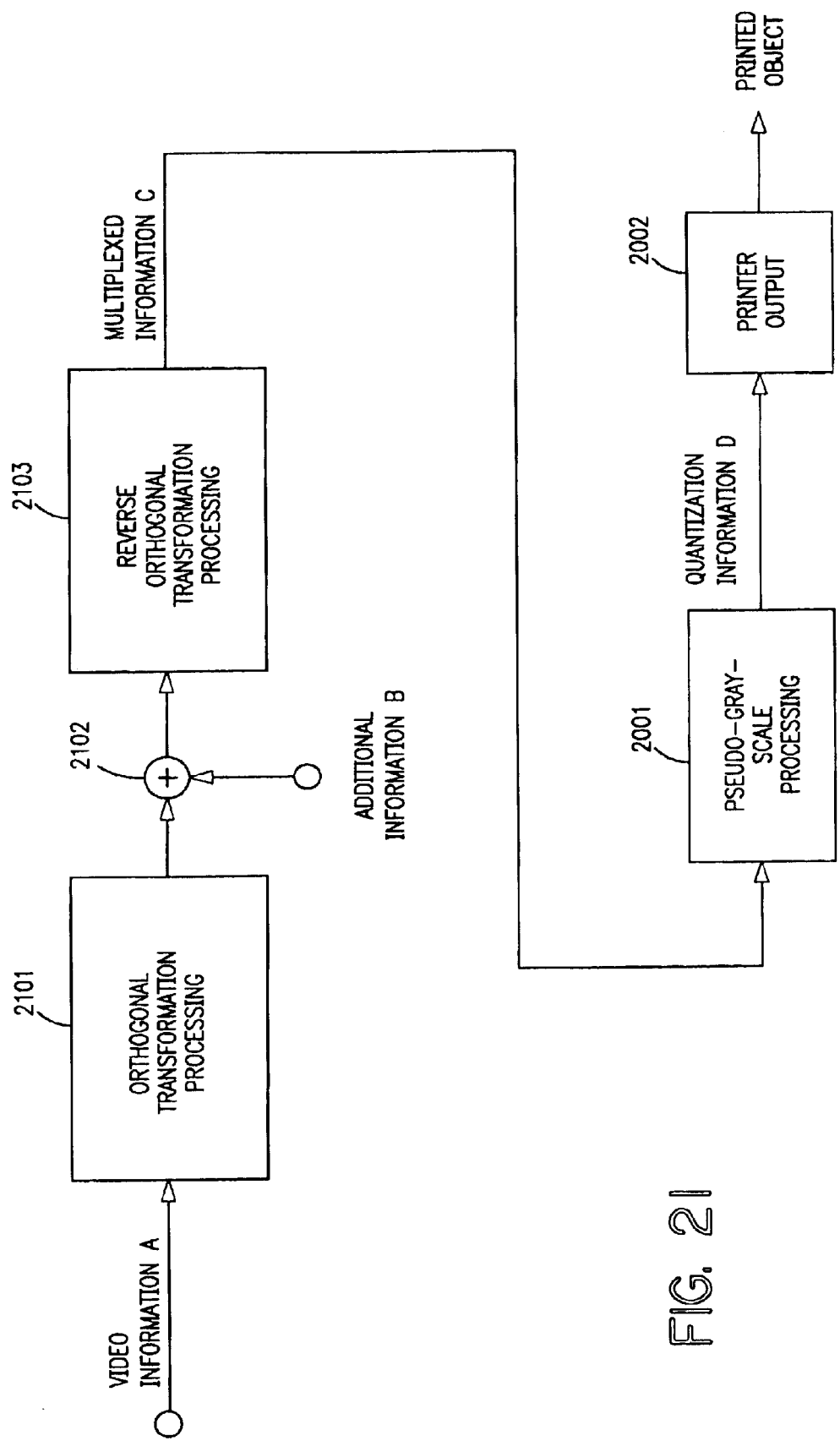
FIG. 21 is a block schematic view showing an example conventional multiplexing method.
Figure 22:
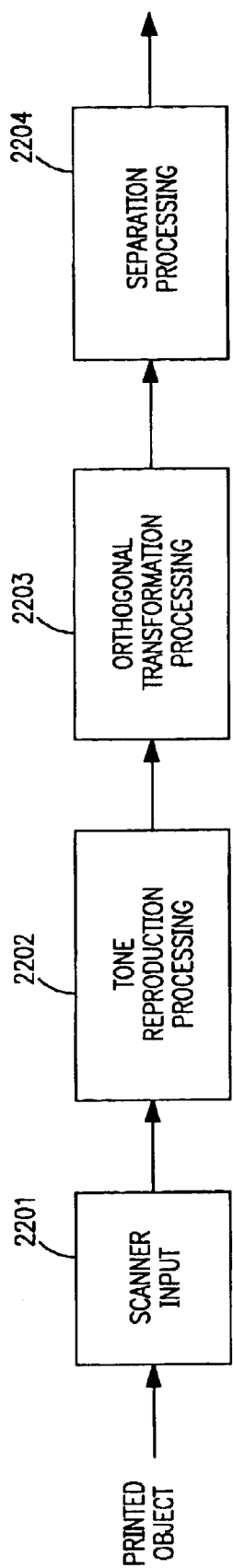
FIG. 22 is a block schematic view showing the example conventional multiplexing method.

FIG. 16 shows a regularity D in the quantization-threshold setting means formed of the small block configured of 8×8 pixels, i.e., 64 pixels. In the figure, the small block consists of 48 pixels that set quantization-threshold setting means f and 16 pixels that set quantization-threshold setting means g. FIGS. 18A and 18B show probability distributions in the quantization-threshold setting means f and g, respectively. As is apparent from the figure, TH4 is fixed (the probability distribution with TH4 is 100%) in the quantization-threshold setting means f, and TH5 is fixed (the probability distribution with TH5 is 100%) in the quantization-threshold setting means g. As described above, different from the organizational dither method, in the error diffusion method, the absolute value of the quantization value does not significantly influence the overall density variation. Therefore, neither TH4 nor TH5 needs to be limited to the intermediate value between the quantization representative values. In addition, a mean value multiplied by the ratio in the small block in either TH4 or T5 does not need to be the intermediate value between the quantization representative values. In the present embodiment, the quantization-threshold setting means is changed to f at a predetermined probability in the quantization-threshold setting means f. For example, to change the quantization-threshold setting means at a probability of 2/16, a random number is used to extract two arbitrary pixels as target pixels from 16 pixels set in the quantization-threshold setting means g, and the quantization-threshold setting means are forcedly changed to the quantization-threshold setting means f.

FIG. 17 shows a changed state of the regularity. In the figure, pixels shown by bold lines are changed pixels. While only the probability for performing the change in the small block, pixels to be changed are not yet determined. Therefore, according to the irregularity of the changed pixels, the preset regularity can be disordered.

FIGS. 16 and 17 show one example type of a regularity change. However, as a matter of course, two or more regularities are necessary.

Either FIG. 18A or 18B shows an example case where the occurrence probability is 100%. However, as a matter of course, the embodiment is not limited thereby.

As above, the method for disordering the regularity set as a quantization condition has been described with reference to examples using random numbers. However, the method for generating random numbers is not limited to the above. The method may be executed according to various types of regularities without using random numbers arrangement. In addition, irregularities may be preserved by using a table.

As above, the additional-information multiplexing unit and the additional-information separating unit have individually been described, the present embodiment is not limited by the combination thereof.

Other Embodiments

In the above-described embodiment, the block-partitioned of the image is performed when the information is separated from the image in order to allow much information to be added to the image.

Therefore, if an image includes additional information of one bit (for example, information indicative of "image output is permitted/not permitted"), the information can be added to the image without performing the block-partitioning of the image. Accordingly, depending on the case, block-partitioning of an image need not be performed to separate information from the image.

The present invention may of course be applied to a system configured of a plurality of apparatuses (for example, a host computer, an interface device, a reader, and a printer), but it may be applied to an independent single apparatus (for example, a photocopy reproduction machine and a facsimile machine).

As a matter of course, the object of the present invention can also be achieved through the execution of software program code stored in a computer readable storage medium. Specifically, software program code for implementing the functions of the above-described embodiment is recorded in a computer readable storage medium (or, a recording medium), and the storage medium is supplied to a system or an apparatus. A computer (or, a processor such as a CPU or an MPU) of the system or the apparatus device reads the program code and controls it to be executed. Thereby, the object of the present invention can be achieved. In this case, the program code read out from the storage medium independently implements the functions of the above-described embodiment. Therefore, the storage medium containing the program code constitutes the present invention. Through the execution of the program code read out by the computer, the functions of the above-described embodiment are implemented. In addition, as a matter of course, the scope of the present invention encompasses a case where, according to instructions of the program code, a part or the entirety of practical processing by an operating system (OS) or the like running in the computer performs, thereby implementing the functions of above-described embodiment.

Furthermore, the scope of the present invention encompasses the following case. The software program code read out from the storage medium is written in a memory provided in a function enhancement unit connected to a function enhancement card inserted in the computer or the computer. Then, according to instructions of the program code, a part or the entirety of practical processing by a CPU or the like provided in the function enhancement card or the function enhancement unit, thereby implementing the functions of above-described embodiment.

As described above, the present invention has the plurality of quantization-threshold setting means, of which occurrence probability distributions are different from one another, for setting a quantization threshold in terms of probability when adding predetermined information to an image. Corresponding to the aforementioned predetermined information, the present invention controls a regularity in the selection of the aforementioned plurality of quantization-threshold setting means in units of a predetermined image region, uses quantization thresholds set by the aforementioned quantization-threshold setting means and thereby quantizes the aforementioned image according to an error diffusion method. Thereby, the present invention minimizes image-quality degradation that can be caused according to the addition of the predetermined information. Concurrently, the present invention enables the predetermined information to be added to the image so that the embedded information can be accurately extracted.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processor unit for adding predetermined information to an image, comprising:
   input means for inputting the image;
   a plurality of quantization-threshold setting means, of which occurrence probability distributions are different from one another, for setting quantization thresholds in terms of probability;
   control means for controlling a regularity for selection of said plurality of quantization-threshold setting means in units of a predetermined image region according to the predetermined information; and
   quantizing means that uses quantization thresholds set by said quantization-threshold setting means and thereby quantizes the image according to an error diffusion method.

2. An image processor unit as claimed in claim 1, further comprising partitioning means for partitioning the input image into a plurality of image regions, wherein said control means controls the regularity for the selection of said plurality of quantization-threshold setting means in units of the partitioned image region according to the predetermined information.

3. An image processor unit as claimed in claim 1, wherein said control means performs the selection of said plurality of quantization-threshold setting means according to a predetermined periodicity.

4. An image processor unit as claimed in claim 1, wherein each of said plurality of quantization-threshold setting means performs selection of a value from a plurality of values and sets the selected value as one of the quantization thresholds.

5. An image processor unit as claimed in claim 4, wherein the selection is performed by using random numbers.

6. An image processor unit as claimed in claim 1, wherein a mean value of the probability distribution of at least one of said plurality of quantization-threshold setting means is other than an intermediate value between quantization representative values.

7. An image processor unit as claimed in claim 6, wherein, when three or more types of said quantization-threshold setting means are used, a mean value of the probability distribution of at least one of said quantization-threshold setting means is greater than an intermediate value between the quantization representative values, and a mean value of the probability distribution of at least one of said quantization-threshold setting means is less than the intermediate value.

8. An image processor unit as claimed in claim 1, wherein said control means determines a combination of said plurality of quantization-threshold setting means according to the predetermined information.

9. An image processor unit as claimed in claim 1, wherein said control means determines an arrangement of said plurality of quantization-threshold setting means according to the predetermined information.

10. An image processor unit as claimed in claim 9, wherein a determination of target pixels is made according to a predetermined probability from the arrangement having a regularity, and quantization-threshold setting means corresponding to the target pixels are changed.

11. An image processor unit as claimed in claim 9, wherein the determination of the target pixels is made by using a random number.

12. An image processor unit as claimed in claim 1, wherein the predetermined information is audio information.

13. An image processor unit as claimed in claim 1, wherein the predetermined information is image-copyright information.

14. An image processor unit as claimed in claim 1, wherein the predetermined information is added not to easily be perceived by the human eye.

15. An image processing method for adding predetermined information to an image, comprising:

an input step for inputting the image;

a quantization-threshold setting step for setting quantization thresholds in terms of probability by using a plurality of quantization-threshold setting means of which occurrence probability distributions are different from one another;

a control step for controlling a regularity for selection of said plurality of quantization-threshold setting means in units of a predetermined image region according to the predetermined information; and a quantizing step that uses quantization thresholds set by said quantization-threshold setting step, and thereby quantizes the image according to an error diffusion method.

16. A computer-readable storage medium containing a program product for adding predetermined information to an image, comprising the code means of:

an input step for inputting the image;

a quantization-threshold setting step for setting quantization thresholds in terms of probability by using a plurality of quantization-threshold setting means of which occurrence probability distributions are different from one another;

a control step for controlling a regularity for selection of said plurality of quantization-threshold setting means in units of a predetermined image region according to the predetermined information; and a quantizing step that uses quantization thresholds set by said quantization-threshold setting step, and thereby quantizes the image according to an error diffusion method.

* * * * *